United States Patent [19]

Heinz

[11] 4,060,315

[45] Nov. 29, 1977

[54] PRECISION MIRROR MOUNT

[75] Inventor: Theodore A. Heinz, Moorpark, Calif.

[73] Assignee: Rockwell International Corporation, El Segundo, Calif.

[21] Appl. No.: 593,357

[22] Filed: July 7, 1975

[51] Int. Cl.² ............................................. G02B 5/08
[52] U.S. Cl. .................................. 350/289; 248/487; 350/310
[58] Field of Search ....................... 350/6, 7, 285, 288, 350/289, 310; 178/7.6; 331/94.5 C, 94.5 D; 248/474, 476, 478–480, 485–487, 495

[56] References Cited

U.S. PATENT DOCUMENTS 3,753,150  8/1973  Zar ............................... 350/289 UX

OTHER PUBLICATIONS

NASA Tech Brief, Brief 66-10199, May 1966.

*Primary Examiner*—F. L. Evans
*Attorney, Agent, or Firm*—L. Lee Humphries; Robert G. Upton

[57] ABSTRACT

Positioning of a mirror mount plate is achieved by driving four differential screw actuators by geared stepping motors providing tip and tilt as well as translation. The plate on which the mirror is mounted is suspended by four specially designed flexure assemblies.

4 Claims, 3 Drawing Figures

PRECISION MIRROR MOUNT

This invention herein described was made in the course of or under a contract or subcontract thereunder, (or grant) with the Department of the Navy.

CROSS-REFERENCE TO RELATED APPLICATION

This invention is related to a copending mirror mount application entitled "Two Axes Remote Mirror Mount," filed June 28, 1976, Ser. No. 700,430 assigned to the same assignee as this invention. The application having a different actuating means than is described and claimed in the present application.

BACKGROUND OF THE INVENTION

1. Field of the Invention

This invention relates to a means to mount and adjust reflecting surfaces such as mirrors and the like.

More particularly, this invention describes and claims a means to position laser mirrors in tip and tilt about an orthogonal axis plus planar translations perpendicular to the mirror surface.

2. Description of the Prior Art

Conventional mirror mounts such as those associated with optical labs and telescopes are generally not suitable to position mirrors utilized in the large laser field of technology.

Typically, conventional mirror mounts are suspended from a base support structure by a system of screw jacks and springs.

These devices are unsuitable in a severe vibration environment commonly associated with, for example, a large laser lab where a system of high-power laser resonator mirror mounts must support mirrors weighing from 25 to 40 pounds each.

Laser mirrors are normally affixed to a plate that is suspended from and movable with respect to a backup support plate firmly mounted to an optical "bench". Since laser beams are generally directed substantially horizontally, the mirror surfaces are generally perpendicular to gravitational forces. Thus, the mirrors are cantilevered from the surface of the support backup plate and must rigidly support a relatively heavy weight suspended therefrom.

A series of springs in conventional mounts between the rigid support plate and the movable plate from which the mirror is mounted provides a force that maintains one or more mirror actuators in compression or tension, thereby stabilizing the mirror. However conventional type spiral springs have little or no resistance to shear forces which are large in heavy laser mirrors cantilevered from a rigid mount. Therefore pins or ball type sockets are generally required to support the movable plate in shear. These supporting devices introduce frictional hysteresis that inherently reduces the required positional accuracy of laser mirrors.

Additionally, where screw type actuation is manually or mechanically manipulated to position mirrors, some type of locking mechanism is required. During activation of the locking mechanism positioning errors may be introduced. For example, the simple procedure of tightening a set screw to "lock" a mirror usually requires much tedious and time consuming trial and error to align one or more mirrors to a desired setting.

The present invention effectively eliminates frictional hysteresis associated with conventional ball or pin supports as well as eliminating the need for mechanical types of locking mechanisms.

In a large laser system several mirrors are located inside vacuum enclosures. Precise positioning requires that these mirrors be adjusted with the vacuum system activated. A remote positioning capability is required which is not found in conventional mounts.

SUMMARY OF THE INVENTION

An apparatus to suspend and remotely position a laser mirror device cantilevered from a fixed support means that comprises a rigid base plate portion affixed to the fixed support with a movable plate spaced from and positioned substantially parallel to the base plate portion. At least three actuation means connected between the base plate portion and the movable plate to provide tip and tilt of the movable plate as well as a means to translate the movable plate away from or toward the rigid base plate portion. At lease one flexure means connected in compression between the rigid base plate portion and the substantially parallel movable plate to preload the at least three actuation means in tension while resisting shear forces resultant from the weight of the mirror mount device cantilevered from the fixed support, and means to lock the at least three actuation means thereby fixing the movable plate in a desired position.

Positioning of a backup plate to which the mirror is mounted is achieved by driving four differential screw actuators with stepping motors. The electronic controls for the stepping motors compensate for "backlash," making it possible to accurately position the mirror. The differential screw in combination with gear reduction provides less than one micro inch of mirror movement per step of actuator motion. The actuators are locked in place by the high static torque of the motors with the fields energized, thus eliminating mirror misalignment which often occurs during locking of conventional mounts when set screws or the like are manually tightened. This feature provides a major advantage over conventional laser mirror mounts.

The backup plate to which the relatively heavy mirror is mounted is suspended from an optical bench by preferably four specially designed flexure assemblies, each assembly consisting of a pair of flexures so arranged to provide maximum shear rigidity with tip, tilt and translational flexibility. These flexure assemblies allow the mirror to tip, tilt and translate with a minimum of frictional hysteresis.

Therefore, it is an object of this invention to provide a precision mirror mount that will support heavy movable laser mirrors with a minimum of frictional hysteresis.

More specifically, it is an object of this invention to provide a precision mirror mount that is actuatable through four stepping motors mechanically connected to the mirror mount by associated differential screw actuators to provide tip, tilt and translational movement of the laser mirrors. The mirror being supported by mirror mount flexure assemblies maintained in compression by the screw jack actuators which are designed to resist shear forces and to minimize frictional hysteresis.

An advantage over the prior art is the elimination of mechanical set screws and the like to set the position of the movable mirror by utilizing the high static torque of the stepping motors with the "fields" energized.

Another advantage over the prior art is the use of specially designed flexure assemblies held in compression that resist shear forces while allowing flexibility in tip and tilt about orthogonal axes plus planar translation perpendicular to the mirror surface.

The above noted objects and advantages of the present invention will be more fully understood upon a study of the following detailed description in conjunction with the detailed drawings.

DESCRIPTION OF THE PREFERRED EMBODIMENTS

Figure 1:
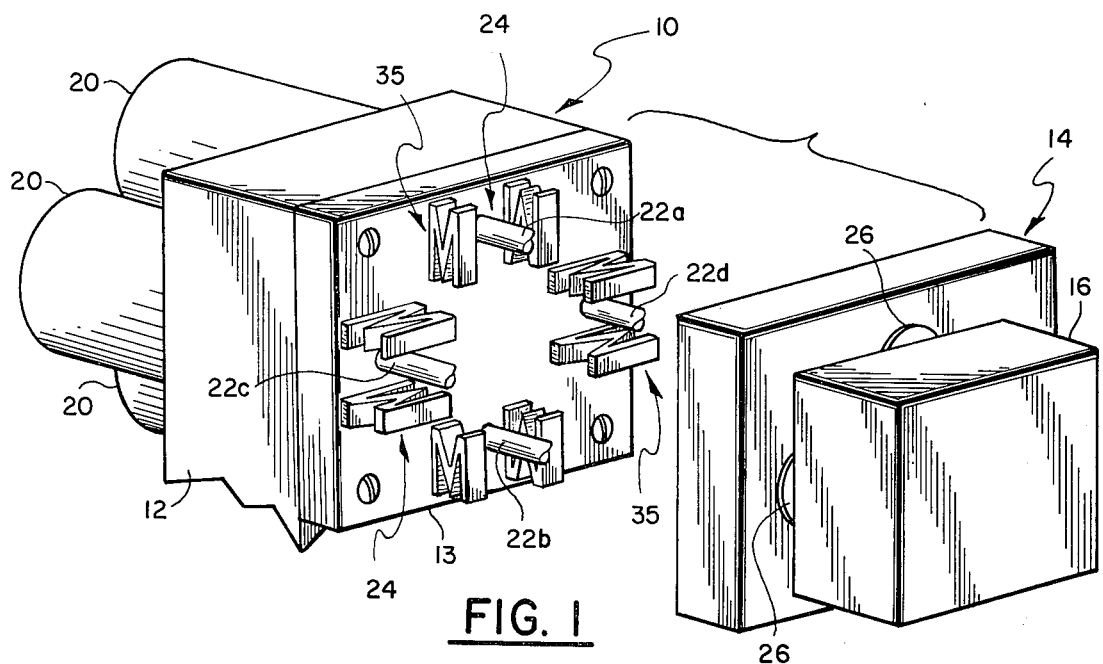
FIG. 1 is an exploded partially cut-away perspective view of the laser mirror mount assembly.
Figure 2:
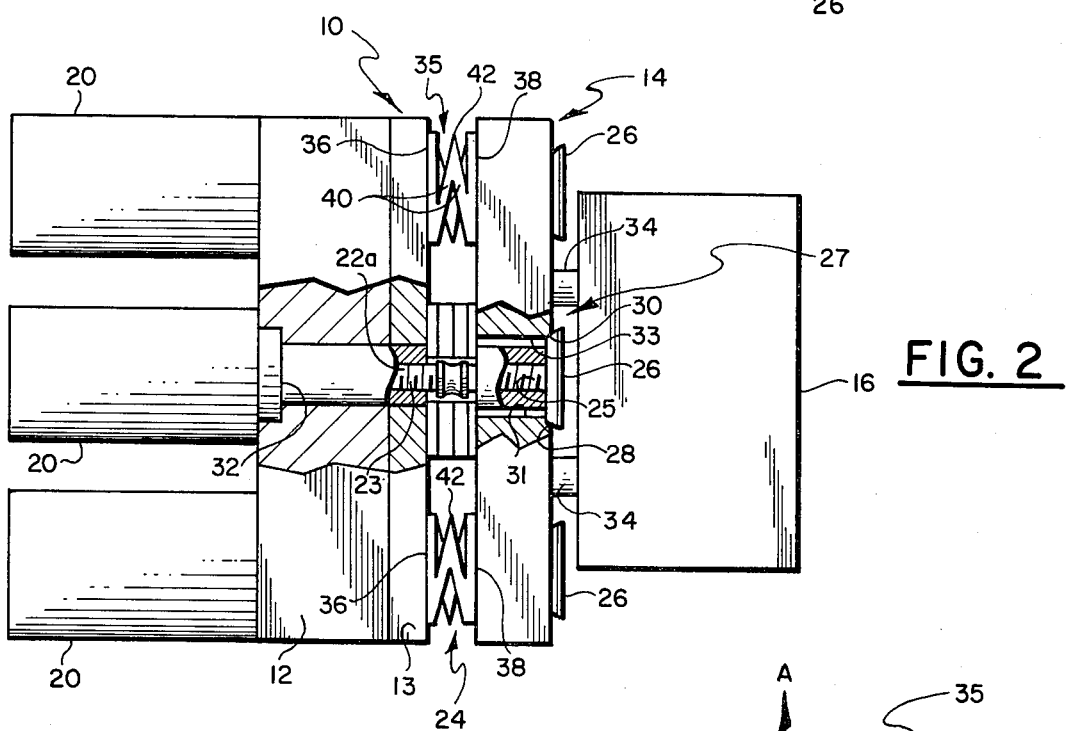
FIG. 2 is a partially cut-away top view of the laser mirror mount assembly.

Turning now to FIG. 1, the mirror mount assembly generally designated as 10 consists of a mirror mount base 12 that is securely mounted to an optical "bench" (not shown). A mount base support plate 13 is secured to base 12 by screws 15 or other suitable means. A backup plate generally designated as 14 anchors, for example, a laser mirror. The backup plate is suspended from and substantially parallel to mount base support plate 13. Backup plate 14 is precisely positionable in tip and tilt about orthogonal axes plus planar translation perpendicular to the mirror surface through the utilization of preferably four stepping motors 20. Each stepping motor 20 is attached to a differential screw 22 that terminates in a ball type socket generally designated as 27 (FIG. 2). The differential screws 22 are maintained in tension by a series of mirror mount flexure assemblies generally designated as 24. The flexure assembly 24 consists of a pair of "V"-shaped flexures 35, one each preferably on opposite sides of each actuator 22.

More specifically, there are preferably four pairs of the flexure assemblies 24 arranged between the base plate 13 and the movable plate 14, the first pair of flexure assemblies 24 being arranged substantially vertically in spaced parallel positions on each side of a first top screw jack actuator 22a. A second pair of flexure assemblies is arranged substantially vertically in spaced parallel position on each side of a second bottom screw jack actuator 22b when the fixed base plate 13 and the movable plate 14 are oriented substantially perpendicular to a horizontal plane. A third pair of the flexure assemblies 24 being arranged substantially horizontally in spaced parallel positions on each side of a third side screw actuator 22c. A fourth pair of flexure assemblies 24 is arranged substantially horizontally in spaced parallel position on each side of a fourth opposite side screw jack actuator 22d, said third and fourth pairs of flexure assemblies 24 are oriented 90° to the first and second pair of vertical flexure assemblies 24 with their respective jointed "V"-shaped beams 40-42 (FIG. 3) of each individual flexure 35 of the four pairs of flexure assemblies 24 being oriented 180°, one from the other, thus providing a substantially rigid shear resistance while maintaining flexibility under tensional and compressional loads for precise angular and translational positioning of the laser mirror mount device.

FIG. 2 illustrates the interconnection between the stepping motors 20 and the movable plate 14. The stepping motors 20 are attached to the back 17 of mirror mount 12. The screw jack actuators 22a, b, c and d coact between base plate retaining nut 32 and backup plate retaining nut 26. The screw jack actuator pitch 25 of retaining nut 32 is different from the pitch of the screw in retaining nut 26 so as to cause plate 14 to translate, tip or tilt as desired.

The spherical back face 28 of retainer 26 is seated within concave surface 30 of backup plate 14. A concentric, axially aligned opening 31 in backup plate 14 provides gap 33 around retaining nut 26 to allow the plate 14 to move without binding.

Figure 3:
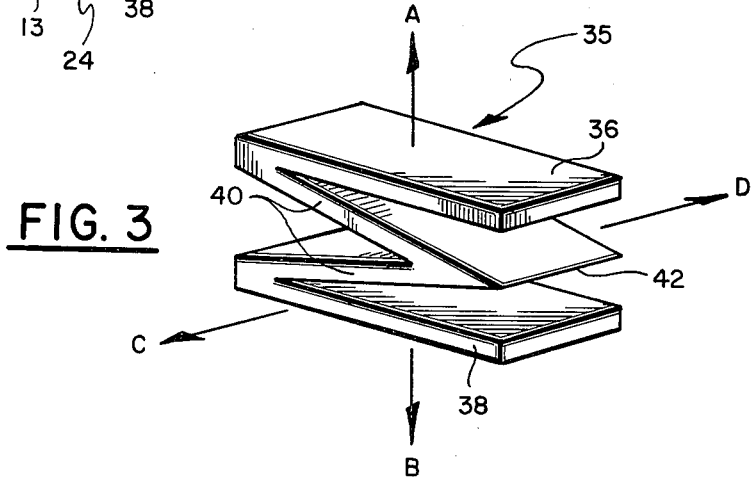
FIG. 3 is an enlarged perspective view of one of the flexures making up the flexure assemblies.

FIG. 3 depicts the individual "V"-shaped flexure mount. Surface or leg 36 is, for example, attached to face plate 13 while leg 38 is affixed to the back of plate 14. Legs 40 converge and are joined at joint 42 suspended between legs 36 and 38, thus flexibility is, for example, maintained in direction "A" and "B" while resisting shear forces in direction "C" and "D".

The use of a stepping motor such as an "open loop" geared stepping motor with, for example, a high gear ratio coupled with the differential screw results in great precision with a built-in holding or locking feature. For example the inherent precision of the geared motor effectively eliminates conventional position indicators such as linear motion transducers, photo encoders, auto collimator and the like. The stepping motor electronic controls (not shown) automatically compensate for "backlash" by always approaching the end point with the same direction of motor rotation.

The differential screw in combination with a stepping motor and gear reduction provides one micro inch or less of mirror movement per step of actuator motion, thus providing mirror alignment accuracy without the use of mechanical mirror mount locking screws or the like.

It would be obvious to position the mirror by utilizing more or less than four stepping motor screw jack actuator combinations, and it would also be obvious to align components other than mirrors such as radar reflectors, transmitter-receivers and the like.

Ordinarily, in the laser field, the laser mirrors are enclosed within a vacuum chamber mounted to the aforementioned optical bench. As a result, the mirror mount 10 is controlled remotely and electronically (not shown).

It will of course be realized that various modifications can be made in the design and operation of the present invention without departing from the spirit thereof.

Thus, while the principal, preferred construction, and mode of operation of the invention have been explained and what is now considered to represent its best embodiment has been illustrated and described, it should be understood that within the scope of the appended claims the invention may be practiced otherwise than as specifically illustrated and described.

I claim:

1. An apparatus to suspend and remotely position, a device cantilevered from a fixed support means comprising:
   a rigid base plate portion affixed to said fixed support,
   a movable plate spaced from and positioned substantially parallel to said base plate portion,
   at least three actuation means connected between said base plate portion and said movable plate to provide tip and tilt of said movable plate as well as a means to translate said movable plate away from or towards said rigid base plate portion,
   at least one flexure means connected in compression between said rigid base plate portion and said substantially parallel movable plate to preload said at least three actuation means in tension while resisting shear forces resultant from the weight of said device cantilevered from said fixed support, said at least one flexure means is a V-shaped beam flexure where one end of a first leg of the V is affixed to said rigid base plate and the end of the second leg of said V-shaped flexure is affixed to said movable plate, the opposite ends of said first and second legs are affixed to each other, the resultant joint is suspended between said rigid base plate and said movable plate, the elastic beams of said V-shaped flexure being under compressive loads to provide rigidity and resistance to shear forces as well as maintaining said actuation means in tension, and means to lock said at least three actuation means thereby fixing said movable plate in a desired position.

2. The invention as set forth in claim 1 wherein said beams of said V-shaped flexure have a greater width than thickness to provide rigidity in shear while remaining flexible under tensional and compressional loads.

3. The invention as set forth in claim 1 wherein there are four pairs of said flexures arranged between said rigid base plate and said movable plate, a first pair of flexures being arranged substantially vertically in spaced parallel position on each side of a first top actuation means, a second pair of flexures arranged substantially vertically in spaced parallel position on each side of a second bottom actuation means when said fixed base plate and said movable plate are oriented substantially perpendicular to a horizontal plane, a third pair of said flexures being arranged substantially horizontally in spaced parallel position on each side of a third side actuation means, a fourth pair of flexures arranged substantially horizontally in spaced parallel position on each side of a fourth opposite side actuation means, said first through fourth actuation means being oriented substantially perpendicular to said rigid base plate and said movable plate, said third and fourth pairs of flexures are oriented 90° to said first and second pair of vertical flexures with their respective jointed beams of each of said four pairs of flexures being oriented 180°, one from another, thus providing a substantially rigid shear resistance while maintaining flexibility under tensional and compressional loads for precise angular and translational positioning of said device.

4. The appartus of claim 1 wherein the cantilevered device is a laser mirror.

* * * * *